(12) United States Patent
Lee et al.

(10) Patent No.: US 9,777,788 B2
(45) Date of Patent: Oct. 3, 2017

(54) ROTORCRAFT VIBRATION SUPPRESSION SYSTEM IN A FOUR CORNER PYLON MOUNT CONFIGURATION

(71) Applicant: BELL HELICOPTER TEXTRON INC., Fort Worth, TX (US)

(72) Inventors: Taeoh Lee, Keller, TX (US); David E. Heverly, II, Arlington, TX (US); Matthew W. Hendricks, Bedford, TX (US); Maurice Griffin, Euless, TX (US); Michael R. Smith, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 806 days.

(21) Appl. No.: 13/736,687

(22) Filed: Jan. 8, 2013

(65) Prior Publication Data
US 2013/0270415 A1 Oct. 17, 2013

Related U.S. Application Data

(63) Continuation-in-part of application No. 13/347,237, filed on Jan. 10, 2012, now Pat. No. 8,672,262.
(Continued)

(51) Int. Cl.
*F16F 7/00* (2006.01)
*B64C 27/00* (2006.01)
*F16F 13/24* (2006.01)

(52) U.S. Cl.
CPC ............. *F16F 7/00* (2013.01); *B64C 27/001* (2013.01); *F16F 13/24* (2013.01); *B64C 2027/002* (2013.01)

(58) Field of Classification Search
CPC ........... F16F 7/00; F16F 13/24; B64C 27/001; B64C 2027/002
(Continued)

(56) References Cited

U.S. PATENT DOCUMENTS 3,836,098 A * 9/1974 Miyashita ............. B64C 27/001
188/380
4,236,607 A * 12/1980 Halwes ................. B64C 27/001
188/379
(Continued)

FOREIGN PATENT DOCUMENTS

CN 20091225341 9/2003
EP 0451084 A2 10/1991
(Continued)

OTHER PUBLICATIONS

Office Action dated Oct. 30, 2014 from counterpart CN App. No. 201310009815.1.
(Continued)

*Primary Examiner* — Brian M O'Hara
*Assistant Examiner* — Keith L Dixon
(74) *Attorney, Agent, or Firm* — James E. Walton

(57) ABSTRACT

The vibration suppression system includes a vibration isolator located in each corner in a four corner pylon mount structural assembly. The combination of four vibration isolators, two being forward of the transmission, and two being aft of the transmission, collectively are effective at isolating main rotor vertical shear, pitch moment, as well as roll moment induced vibrations. Each opposing pair of vibration isolators can efficiently react against the moment oscillations because the moment can be decomposed into two antagonistic vertical oscillations at each vibration isolator. A pylon structure extends between a pair of vibration isolators
(Continued)

thereby allowing the vibration isolators to be spaced a away from a vibrating body to provide increased control.

6 Claims, 8 Drawing Sheets

Related U.S. Application Data

(60) Provisional application No. 61/597,557, filed on Feb. 10, 2012.

(58) Field of Classification Search
 USPC .......................................... 244/17.11, 17.13
 See application file for complete search history.

(56) References Cited

U.S. PATENT DOCUMENTS

| | | | | |
|---|---|---|---|---|
| 4,362,281 A * | 12/1982 | Cresap | ................. | B64C 27/001 188/379 |
| 4,365,771 A | 12/1982 | Halwes | | |
| 4,372,431 A | 2/1983 | Desjardins | | |
| 5,310,137 A * | 5/1994 | Yoerkie, Jr. | ........... | B64C 27/001 188/379 |
| 5,732,905 A * | 3/1998 | Krysinski | ............. | B64C 27/001 244/17.13 |
| 6,138,947 A * | 10/2000 | Welsh | ................ | G10K 11/1788 244/1 N |
| 6,193,206 B1 * | 2/2001 | Yasuda | ................. | F16F 7/1005 188/378 |
| 6,431,530 B1 * | 8/2002 | Stamps | ..................... | F16F 1/38 267/136 |
| 7,784,773 B1 * | 8/2010 | Sanetick | ............... | F16F 1/3935 244/17.11 |
| 8,328,129 B2 * | 12/2012 | Smith | ..................... | B64C 27/12 244/17.11 |
| 8,731,743 B2 * | 5/2014 | Seifert | .................. | B64C 27/001 188/316 |
| 2011/0316207 A1 * | 12/2011 | Smith | ................... | B64C 27/001 267/140.15 |
| 2012/0279816 A1 * | 11/2012 | Smith | ..................... | F16F 13/08 188/269 |

FOREIGN PATENT DOCUMENTS

| | | |
|---|---|---|
| WO | 01/90597 A1 | 11/2001 |
| WO | 2008/045073 A2 | 4/2008 |

OTHER PUBLICATIONS

Office Action dated Dec. 9, 2014 from counterpart CA App. No. 2,802,152.
Extended European Search Report in related European patent application No. 13150789.9, 6 pages, mailed Jan. 20, 2014.
Canadian Examination Report in related Canadian patent application No. 2,802,152, 2 pages, mailed Feb. 5, 2014.
Office Action dated Sep. 18, 2015 from counterpart CA App. No. 2,802,152.
Office Action dated Jan. 29, 2016 from counterpart CA App. No. 2,802,152.

* cited by examiner

ROTORCRAFT VIBRATION SUPPRESSION SYSTEM IN A FOUR CORNER PYLON MOUNT CONFIGURATION

BACKGROUND

Technical Field

The present application relates in general to vibration control. More specifically, the present application relates to systems for isolating mechanical vibrations in structures or bodies that are subject to harmonic or oscillating displacements or forces. The systems of the present application are well suited for use in the field of aircraft, in particular, helicopters and other rotary wing aircraft.

Description of Related Art

For many years, effort has been directed toward the design of an apparatus for isolating a vibrating body from transmitting its vibrations to another body. Such apparatuses are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from damping devices in the prior art that are erroneously referred to as "isolators." A simple force equation for vibration is set forth as follows:

$$F = m\ddot{x} + c\dot{x} + kx$$

A vibration isolator utilizes inertial forces ($m\ddot{x}$) to cancel elastic forces ($kx$). On the other hand, a damping device is concerned with utilizing dissipative effects ($c\dot{x}$) to remove energy from a vibrating system.

One important engineering objective during the design of an aircraft vibration-isolation system is to minimize the length, weight, and overall size including cross-section of the isolation device. This is a primary objective of all engineering efforts relating to aircraft. It is especially important in the design and manufacture of helicopters and other rotary wing aircraft, such as tilt rotor aircraft, which are required to hover against the dead weight of the aircraft, and which are, thus, somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
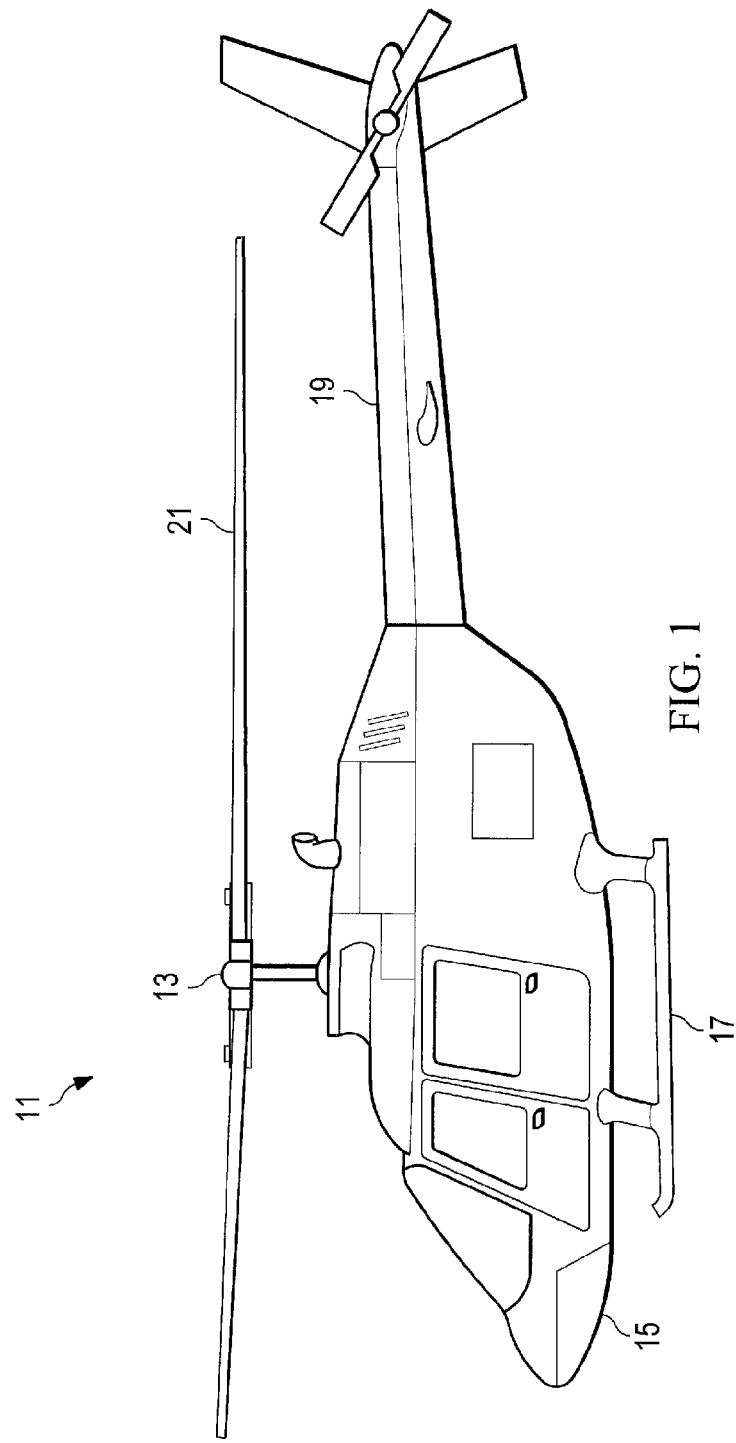
FIG. 1 is a side view of a rotorcraft having a vibration suppression system, according to an illustrative embodiment of the present application.

Referring to FIG. 1 in the drawings, a rotorcraft 11 is illustrated. Rotorcraft 11 has a rotor system 13 with a plurality of rotor blades 21. Rotorcraft 11 further includes a fuselage 15, landing gear 17, and an empennage 19. A main rotor control system can be used to selectively control the pitch of each rotor blade 21 in order to selectively control direction, thrust, and lift of rotorcraft 11. It should be appreciated that even though rotorcraft 11 is depicted as having certain illustrated features, it should be appreciated that rotorcraft 11 can take on a variety of implementation specific configurations, as one of ordinary skill in the art would fully appreciate having the benefit of this disclosure. Further, it should be appreciated that rotorcraft 11 can have variety of rotor blade quantities. It should be understood that the systems of the present application may be used with any aircraft on which it would be desirable to have vibration isolation, including unmanned aerial vehicles that are remotely piloted.

Figure 2A:
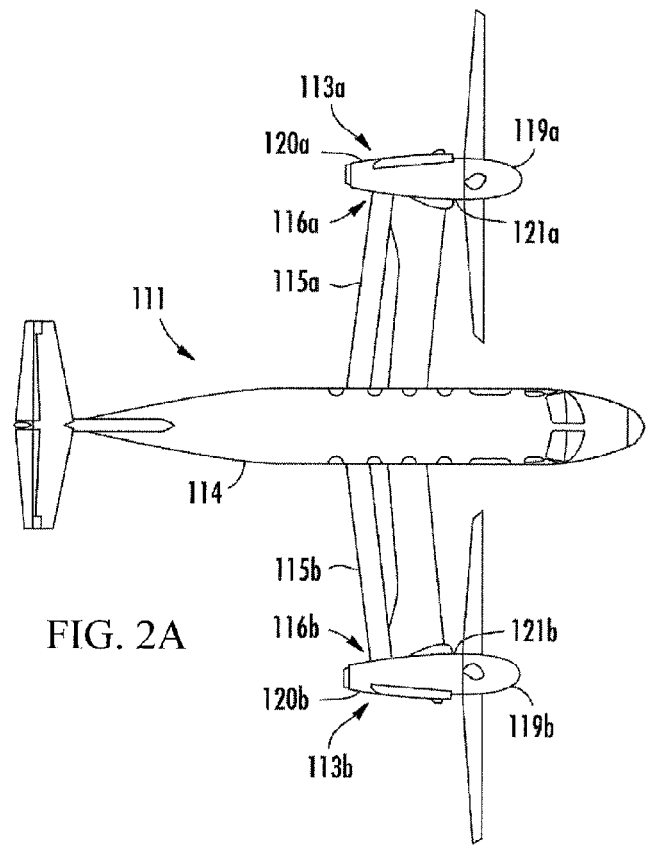
FIG. 2A is a plan view of a tilt rotor aircraft, according to the present application in an airplane mode.
Figure 2B:
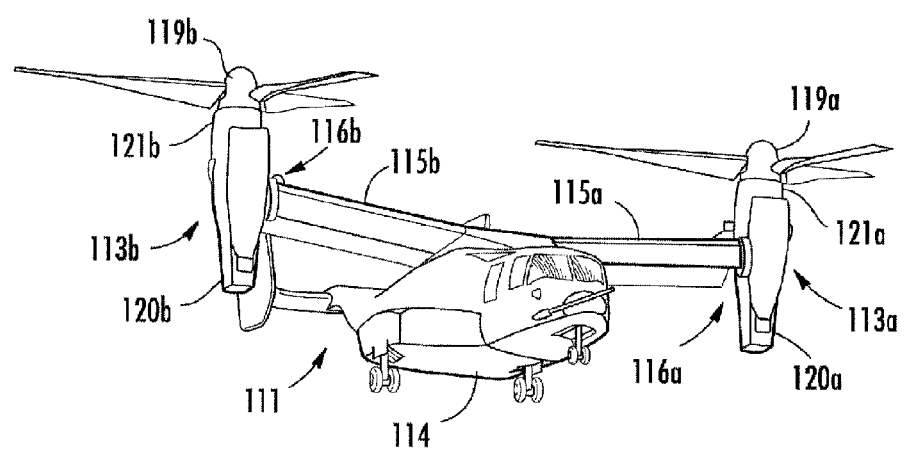
FIG. 2B is a perspective view of a tilt rotor aircraft, according to the present application in a helicopter mode.

The systems of the present application may also be utilized on other types of rotary wing aircraft. Referring now to FIGS. 2A and 2B in the drawings, a tilt rotor aircraft 111 according to the present application is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2A, tilt rotor aircraft 111 is shown in the airplane mode; and in FIG. 2B, tilt rotor aircraft 111 is shown in the helicopter mode. As shown in FIGS. 2A and 2B, wings 115a and 115b are coupled to a fuselage 114. Tilt rotor aircraft 111 also includes a vibration isolation system according to the present application for isolating fuselage 114 or other portions of tilt rotor aircraft 111 from mechanical vibrations, such as harmonic vibrations, which are associated with the propulsion system and which arise from the engines, transmissions, and rotors of tilt rotor aircraft 111.

Figure 3:
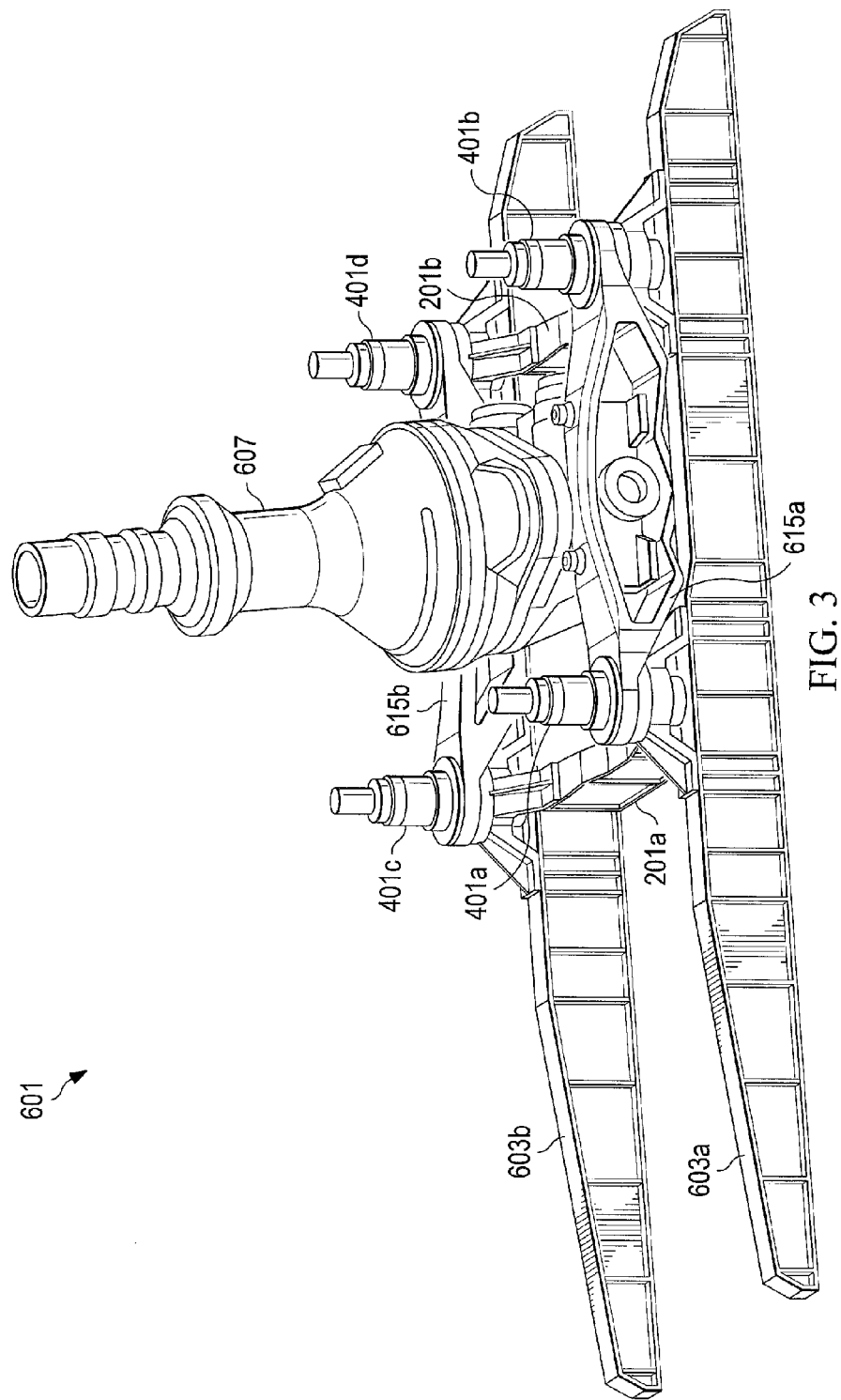
FIG. 3 is a side view of the vibration suppression system, according to an illustrative embodiment of the present application.
Figure 4:
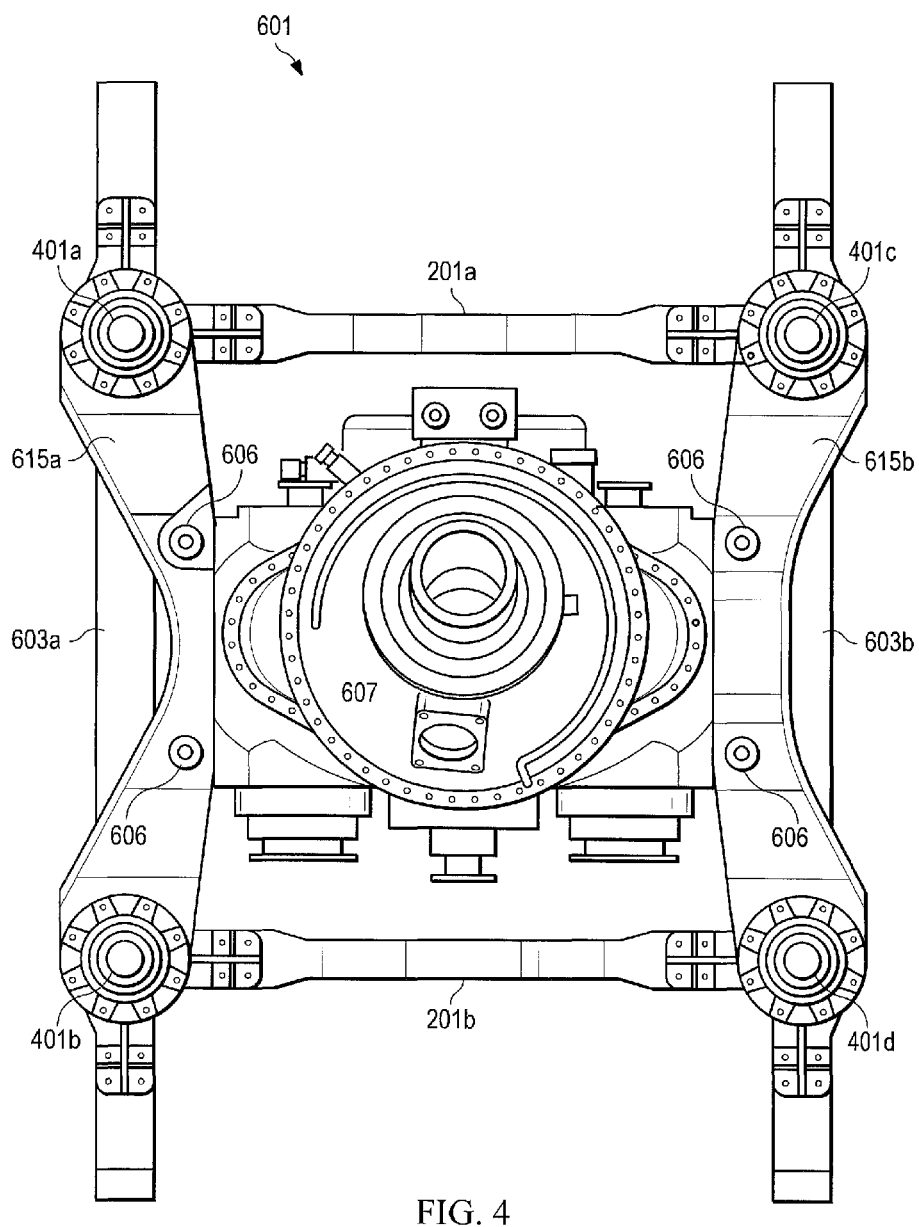
FIG. 4 is a top view of the vibration suppression system, according to an illustrative embodiment of the present application.
Figure 5:
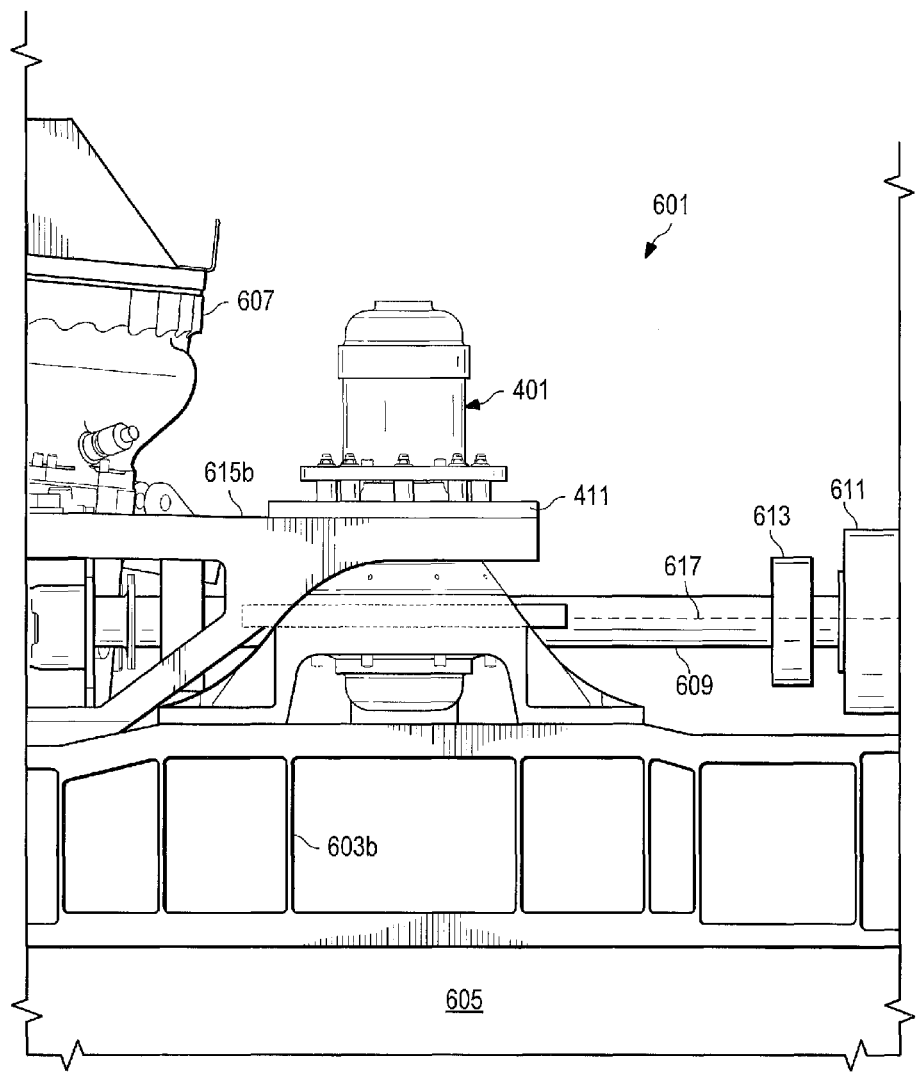
FIG. 5 is a partial side view of the vibration suppression system, according to an illustrative embodiment of the present application.

Referring to FIGS. 3-5, a vibration suppression system 601 is illustrated. System 601, also termed a vibration isolator system, includes a vibration isolator 401 located in each corner in a four corner pylon mount structural assembly. The combination of four vibration isolators 401, two being forward of transmission 607, and two being aft of transmission 607, collectively are effective at isolating main rotor vertical shear, pitch moment, as well as roll moment induced vibrations. For example, rotor hub induced pitch moment vibrations, which can become relatively large in high-speed forward flight, can be effectively isolated with the four vibration isolators, corner located as shown in FIGS. 3 and 4. Locating isolators 401 away from the transmission is an improvement over legacy configurations which typically couple the transmission directly to the isolator. However, this is not the case in the present application.

The four corner pylon mount structural assembly includes a first pylon structure 615a, second pylon structure 615b, a first roof beam 603a, a second roof beam 603b, a forward cross member 201a, and an aft cross member 201b. Structural adapters can be used to structurally couple roof beams 603a and 603b with cross members 201a and 201b. In the illustrated embodiment, roof beams 603a and 603b are coupled to an airframe 605, while pylon structures 615a and 615b are coupled to isolators 401. First pylon structure 615a is mounted with a first vibration isolator 401a and a second vibration isolator 401b, while a second pylon structure 615b is mounted with a third vibration isolator 401c and a fourth vibration isolator 401d. Each vibration isolator 401a-d is mounted substantially vertical, as illustrated in FIG. 5. Transmission 607 is coupled to pylon structures 615a and 615b as opposed to direct coupling to the isolators. A driveshaft 609 carries mechanical power from an engine 611 to transmission 607. It should be appreciated that embodiments of pylon system 601 may employ any practical number of engines and transmissions. Furthermore, it is contemplated that any plurality of pylon structures and vibration isolators may be used in a variety of orientations spaced fore, aft, and even outboard of transmission 607.

As seen in FIGS. 4 and 5, isolators 401a-d are mounted away from transmission 607. For example, isolators 401a-d are mounted forward and aft of transmission 607. Additionally, isolators 401a-d are mounted outboard from transmission 607. As depicted in FIG. 4, isolators 401a-d are mounted sufficiently outboard so as to be located further outboard than the point of coupling 606 between transmission 607 and pylon structures 615a and 615b. The point of coupling 606 is inboard between roof beams 603a, 603b. In so doing, two isolators 401a, 401c are positioned above roof beams 603a, 603b forward of transmission 607. Likewise two isolators 401b, 401d are positioned above roof beams 603a, 603b aft of transmission 607. Isolators 401a-d are spaced away from the point of coupling between pylon structures 615a and 615b and the transmission in fore, aft, and outboard directions in the preferred embodiment. However, it is understood that other embodiments may adjust the spacing do affect dynamics from different aircraft or transmissions.

Pylon structures 615a, 615b are configured to correlate motion of the transmission between a plurality of isolators 401 simultaneously by suspending a portion of transmission 607 between a plurality of isolators located on opposing ends of the pylon structure. The use of pylon structures 615a, 615b permits an aircraft to space the location of isolators 401a-d to an infinite number of locations independent of transmission 607. Locating isolators forward and aft of transmission permits the pylon mount structural assembly minimizes the size of each isolator 401a-d and avoids the use of additional elements to control the dynamics of transmission 607. For example, the pylon mount structural assembly is springless in that the assembly does not use a spring mounted externally beneath the transmission to control dynamics of the transmission. The pylon mount structural assembly is configured to control pitch and roll dynamics by spacing of isolators 401a-d and the use of pylon structures 615a and 615b.

Further, implementing active vibration isolators, such as piezoelectric vibration isolators, can be effective for vibration isolation for a multiple RPM rotorcraft. It should be appreciated that other active actuation methods can be used as well, such as hydraulic, electromagnetic, electromechanical, to name a few. Active vibration isolators can also achieve better vibration isolation by overcoming damping losses, and adjusting the frequency response characteristics. Further, each opposing pair of vibration isolators 401 can efficiently react against the moment oscillations because the moment can be decomposed into two antagonistic vertical oscillations at each vibration isolator 401.

Figure 6:
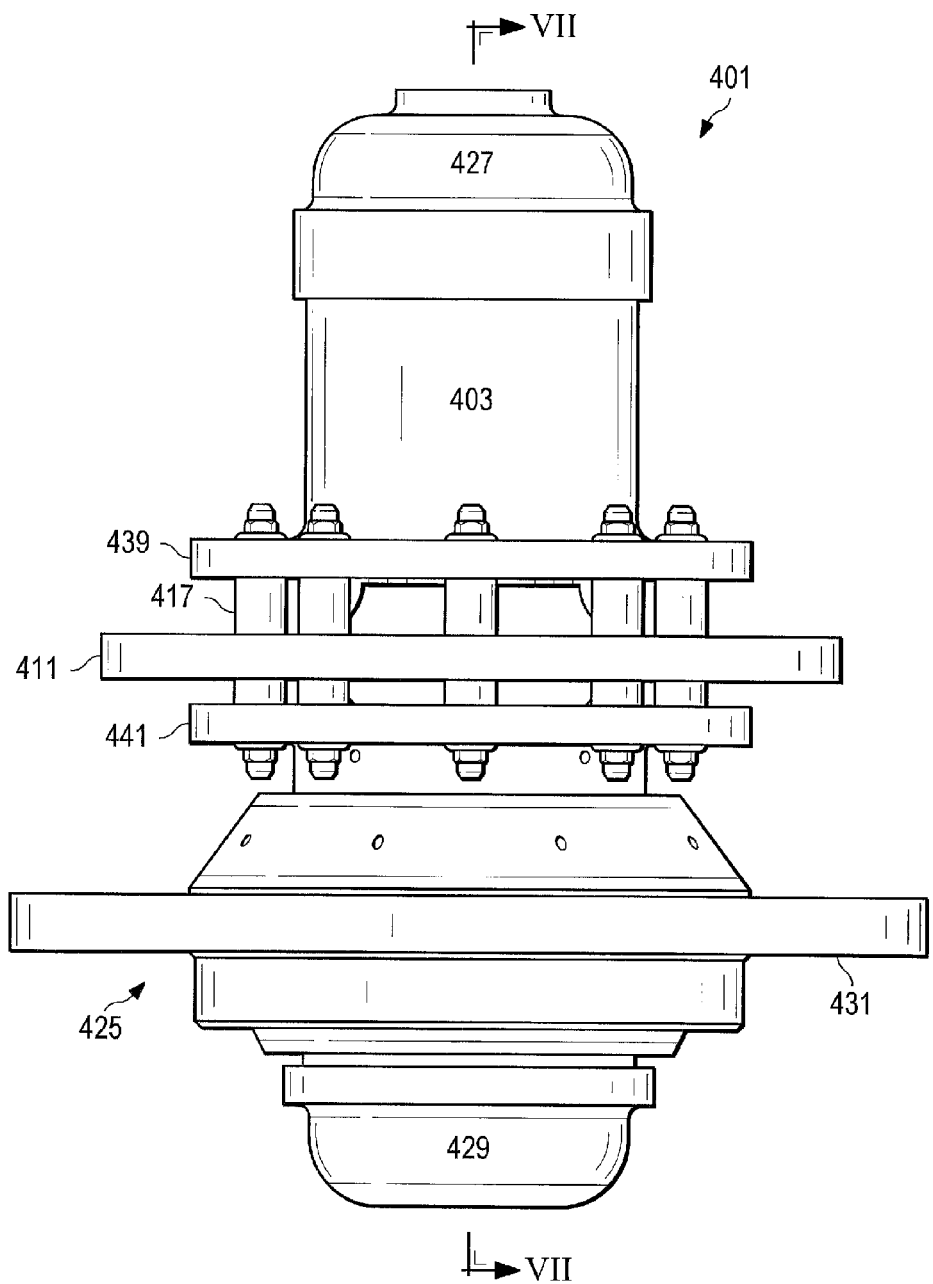
FIG. 6 is a side view of an exemplary embodiment of a vibration isolator, according to an illustrative embodiment of the present application.
Figure 7:
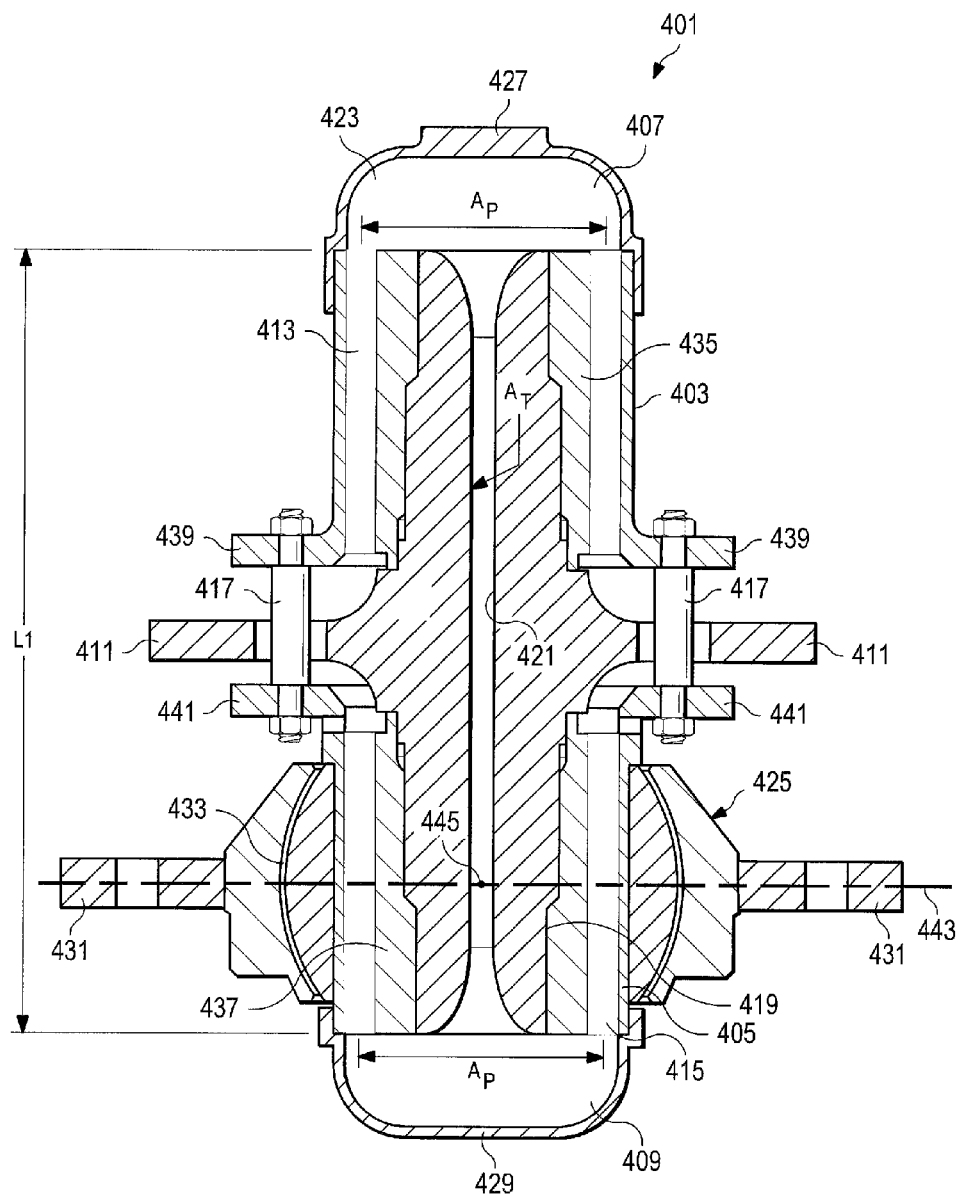
FIG. 7 is a section view of the vibration isolator, taken at section lines VII-VII, according to an illustrative embodiment of the present application.

Referring now also to FIGS. 6 and 7 in the drawings, isolator 401 comprises an upper housing 403 and a lower housing 405. An upper reservoir housing 427 and a lower reservoir housing 429 are coupled to end portions of upper housing 403 and a lower housing 405, respectively. Each upper reservoir housing 427 and a lower reservoir housing 429 define an upper fluid chamber 407 and a lower fluid chamber 409, respectively. A piston spindle 411 includes a cylindrical portion that is at least partially disposed within the interior of upper housing 403 and lower housing 405. A plurality of studs 417 rigidly couple together upper housing 403 and a lower housing 405 via an upper ring 439 and a lower ring 441, respectively, so that upper housing 403 and lower housing 405 function as a single rigid body. Studs 417 extend through piston spindle 411 within apertures sized to prevent any contact between studs 417 and piston spindle 411 during operation. Further, piston spindle 411 is resiliently coupled to upper housing 403 and lower housing 405 via an upper elastomer member 413 and a lower elastomer member 415, respectively. Upper elastomer member 413 and lower elastomer member 415 each function similar to a journal bearing, as further discussed herein.

Piston spindle 411 is coupled to a vibrating body, such as a transmission of an aircraft via a pylon assembly, such as a pylon assembly 601. A spherical bearing assembly 425 is coupled to lower housing 405. Spherical bearing assembly 425 includes an attachment member 431 configured for coupling the spherical bearing assembly 425 to a body to be isolated from vibration, such as a roof beam of an airframe in an aircraft, such as roof beam 603. In such an arrangement, the airframe serves as the body to be isolated from vibration, and the transmission of the aircraft serves as the vibrating body. Spherical bearing assembly 425 includes a spherical elastomeric member 433 having an elastomeric material bonded between a non-resilient concave member and a non-resilient convex member. Spherical elastomeric member 433 is configured to compensate for misalignment in loading between the pylon assembly 601 and roof beam 603 through shearing deformation of the elastomeric material. Spherical elastomeric member 433 is partially spherical shaped with a rotational center point 445 that lies on a centerline plane 443 of attachment member 431. Furthermore, spherical bearing assembly 425 is positioned and located to reduce an overall installation height of vibration isolator 401, as well as provide optimized performance of pylon assembly 601 and related propulsion components.

Upper elastomer member 413 and lower elastomer member 415 seal and resiliently locate piston spindle 411 within the interior upper housing 403 and lower housing 405. Upper housing 403 and lower housing 405 can each be coupled to piston spindle 411 with an upper adapter 435 and lower adapter 437, respectively. Upper elastomer member 413 and lower elastomer member 415 function at least as a spring to permit piston spindle 411 to move or oscillate relative to upper housing 403 and lower housing 405. Upper elastomer member 413 and lower elastomer member 415 can be a solid elastomer member, or alternatively can be alternating layers of non-resilient shim members and elastomer layers.

Isolator 401 further includes an elongated portion 419 integral with piston spindle 411, the elongated portion 419 being configured to define a tuning passage 421. Tuning passage 421 axially extends through elongated portion 419 to provide for fluid communication between upper fluid chamber 407 and lower fluid chamber 409. The approximate length of tuning passage 421 preferably coincides with the length of elongated portion 419, and is further defined by L1. Tuning passage 421 is generally circular in cross-section and can be partially tapered longitudinally in order to provide efficient fluid flow.

A tuning fluid 423 is disposed in upper fluid chamber 407, lower fluid chamber 409, and tuning passage 421. Tuning fluid 423 preferably has low viscosity, relatively high density, and non-corrosive properties. For example, tuning fluid 423 may be a proprietary fluid, such as SPF I manufactured by LORD CORPORATION. Other embodiments may incorporate hydraulic fluid having suspended dense particulate matter, for example.

The introduction of a force into piston spindle 411 translates piston spindle 411 and elongated portion 419 relative to upper housing 403 and lower housing 405. Such a displacement of piston spindle 411 and elongated portion 419 forces tuning fluid 423 to move through tuning passage 421 in the opposite direction of the displacement of piston spindle 411 and elongated portion 419. Such a movement of tuning fluid 423 produces an inertial force that cancels, or isolates, the force from piston spindle 411. During typical operation, the force imparted on piston spindle 411 is oscillatory; therefore, the inertial force of tuning fluid 423 is also oscillatory, the oscillation being at a discrete frequency, i.e., isolation frequency.

The isolation frequency ($f_i$) of vibration isolator 401 can be represented by the following equation:

$$f_i = \frac{1}{2\pi}\sqrt{\frac{K}{R(R-1)m_t}}$$

In the above equation, R represents the ratio of the functional area $A_p$ of piston spindle 411 to the total area $A_T$ inside the tuning passage 421. As such, $R = A_p/A_T$. Mass of tuning fluid 423 is represented by $m_t$. The combined spring rate of elastomer members 413 and 415 is represented by K.

It should be appreciated that isolator 401 is merely exemplary of a wide variety of vibration isolators that may be used. For example, vibration isolator 401 is illustrated as a passive vibration isolator; however, it should be fully appreciated that vibration isolator 401 can also be of an active isolator. An active isolator is configured so that the isolation frequency can be selective changed during operation. For example, an active vibration isolator is illustrated in U.S. Patent Application Publication No. US 2006/0151272 A1, titled "Piezoelectric Liquid Inertia Vibration Eliminator", published 13 Jul. 2006, to Michael R. Smith et al., which is hereby incorporated by reference.

Vibration suppression system 601 is configured such that transmission 607 is "soft mounted" with a vibration isolator 401a-d located at each end of a pylon structure 615. During operation, each vibration isolator 401a-d allows each pylon structure 615a, 615b to float relative to roof beams 603a, 603b through the deformation of upper elastomer member 413, lower elastomer member 415, and spherical elastomeric member 433. If coupling 613 is required to compensate for a large amount of axial and angular misalignment, then the size and complexity of coupling 613 is undesirably large. Further, it is desirable to minimize the size and complexity of aircraft components in order to minimize weight and expense of the aircraft, thereby maximizing performance and reducing manufacturing associated expenditure. As such, vibration isolators 401a-d are uniquely configured to reduce the size and complexity of drive system components, such as coupling 613. More specifically, spherical bearing assembly 425 is configured so that centerline plane 443 of attachment member 431 lies on or near a waterline plane of driveshaft axis 617 so as to reduce a moment arm that could otherwise contribute to axial (chucking) misalignment. An undesirable moment arm could be produced if centerline plane 443 of attachment member 431 were to lie a significant moment arm distance, as measured in the waterline direction, from driveshaft axis 617. Chucking occurs essentially when engine 611 and transmission translate towards or away from each other. Further, the location of spherical bearing assembly 425 circumferentially around lower housing 405 reduces the overall height of vibration isolators 401a-d. A compact pylon system 601 improves performance by reducing moment arms that can react between components.

Figure 8:
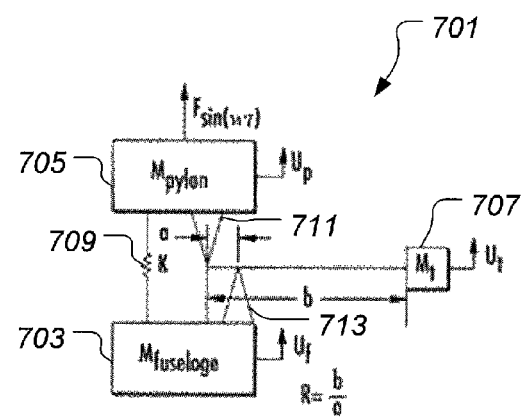
FIG. 8 is a mechanical equivalent force diagram of the vibration isolator of FIGS. 6 and 7.

Referring briefly to FIG. 8 in the drawings, a mechanical equivalent model 701 for vibration isolator 401 of FIGS. 4 and 5 is illustrated. In mechanical equivalent model 701, a box 703 represents the mass of the fuselage $M_{fuselage}$; a box 705 represents the mass of the pylon assembly $M_{pylon}$; and a box 707 represents the mass of the tuning mass $M_t$, in this case, the mass of tuning fluid 423. A vibratory force $F \cdot \sin(\omega t)$ is generated by the transmission and propulsion system. Force $F \cdot \sin(\omega t)$ is a function of the frequency of vibration of the transmission and propulsion system.

Force $F \cdot \sin(\omega t)$ causes an oscillatory displacement $u_p$ of the pylon assembly; an oscillatory displacement of the fuselage $u_f$; and an oscillatory displacement of the tuning mass $u_t$. Elastomer members 413 and 415 are represented by a spring 709 disposed between the fuselage $M_{fuselage}$ and the pylon assembly $M_{pylon}$. Spring 709 has a spring constant K.

In mechanical equivalent model 701, tuning mass $M_t$ functions as if cantilevered from a first fulcrum 711 attached to the pylon assembly $M_{pylon}$, and a second fulcrum 713 attached to the fuselage $M_{fuselage}$. The distance a from first fulcrum 711 to second fulcrum 713 represents the cross-sectional area of tuning passage 421, and the distance b from first fulcrum 711 to the tuning mass $M_t$ represents the effective cross-sectional area of piston spindle 411, such that an area ratio, or hydraulic ratio, R is equal to the ratio of b to a. Mechanical equivalent model 701 leads to the following equation of motion for the system:

$$\begin{bmatrix} M_{pylon} + (R-1)^2 M_t & -R(R-1)M_t \\ -R(R-1)M_t & M_{fuselage} + R^2 M_t \end{bmatrix} \begin{Bmatrix} \ddot{u}_p \\ \ddot{u}_f \end{Bmatrix} + \begin{bmatrix} K & -K \\ -K & K \end{bmatrix} \begin{Bmatrix} u_p \\ u_f \end{Bmatrix} = \begin{Bmatrix} F\sin(\omega t) \\ 0 \end{Bmatrix}$$

As is evident, no means for actively tuning vibration isolator 401 is available. Once the cross-sectional areas of tuning passage 421 and piston spindle 411 are determined, and the tuning fluid is chosen, the operation of vibration isolator 401 is set. However, an embodiment of vibration isolator 401 can be configured such that the isolation frequency can be selectively altered and optimized by the removing and replacing elongated portion 419 from piston spindle 411 with another elongated portion 419 having a different diameter tuning passage 421. As such, vibration isolator 401 can be adaptable to treat a variety of isolation frequencies, as well as being adaptable for variances in stiffness K of upper and lower elastomer members 413 and 415.

Figure 9:
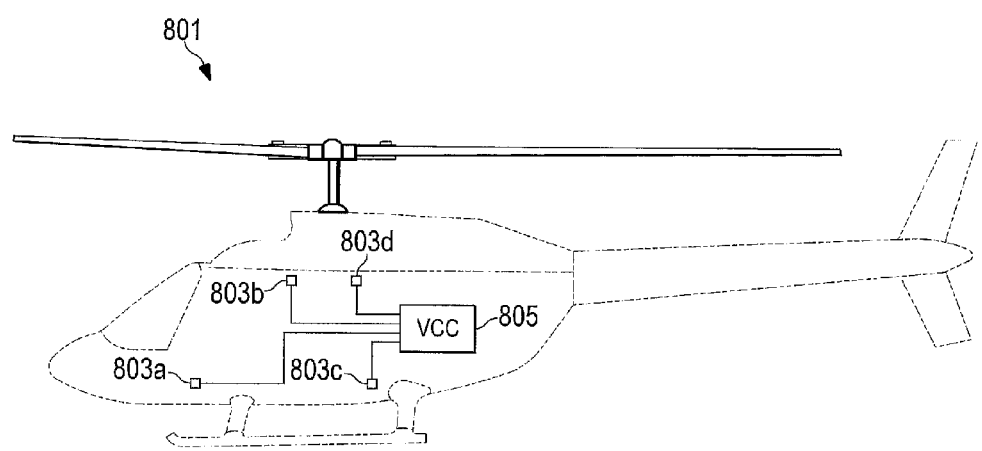
FIG. 9 is a schematic view of an active vibration control system, according to an illustrative embodiment of the present application.

Referring now also to FIG. 9, an active vibration control system 801 is illustrated. System 801 can includes a plurality of vibration feedback sensors 803a-803d in communication with a vibration control computer (VCC) 805. VCC 805 is in communication with each active vibration isolator in system 601 so that the isolation frequency of each active vibration isolator can be actively modified during operation. The vibration control system is configured to detect and convey vibration data through a plurality of feedback sensors 803a-803d to regulate the isolation frequency of at least one vibration isolator 401a-d.

The vibration suppression system of the present application provides significant advantages, including: 1) efficient and effective vibration suppression rotor induced vertical hub shear forces, hub pitch moments, and hub roll moments; 2) improved occupant ride quality; 3) improved life of life critical rotorcraft components; 4) decreased size of isolators; and 5) ability to control the roll, pitch, and shear without the assistance of externally mounted systems to the transmission.

It is apparent that embodiments with significant advantages have been described and illustrated. Although the embodiments in the present application are shown in a limited number of forms, it is not limited to just these forms, but is amenable to various changes and modifications without departing from the spirit thereof.

The invention claimed is:

1. A pylon mount structural assembly for an aircraft, comprising:
    a first pylon structure extending between a first set of vibration isolators, the pylon structure being configured to suspend a first portion of a vibrating body between the first set of vibration isolators; and
    a second pylon structure extending between a second set of vibration isolators, the pylon structure being configured to suspend a second portion of the vibrating body between the second set of vibration isolators;
    wherein each pylon structure is formed to locate the vibration isolators away outboard from a point of coupling between the vibrating body and each of the first and the second pylon structure;
    wherein each vibration isolator includes a spherical bearing assembly having a spherical elastomeric member coupled to an airframe of the aircraft;
    wherein each of the spherical bearing assemblies are located on a centerline plane equal to a waterline of a driveshaft axis; and
    wherein a location of the spherical bearing assembly minimizes chucking in a coupling.

2. The pylon mount structural assembly according to claim 1, wherein the spherical elastomeric member is configured to rotationally deform about a center point, the center point lying on a centerline plane of an attachment member.

3. The pylon mount structural assembly according to claim 1, wherein each set of vibration isolators are separated from the vibrating body to increase control of a roll dynamic and a pitch dynamic of the vibrating body.

4. The pylon mount structural assembly according to claim 1, further comprising a cross member configured to extend between the first and the second pylon structure.

5. The pylon mount structural assembly according to claim 1, wherein each vibration isolator includes a piston spindle resiliently coupled to an upper housing with an upper elastomer member, the piston spindle being resiliently coupled to a lower housing with a lower elastomer member.

6. The pylon mount structural assembly according to claim 5, wherein the piston spindle is configured for coupling to the vibrating body.

* * * * *